Figure 1:
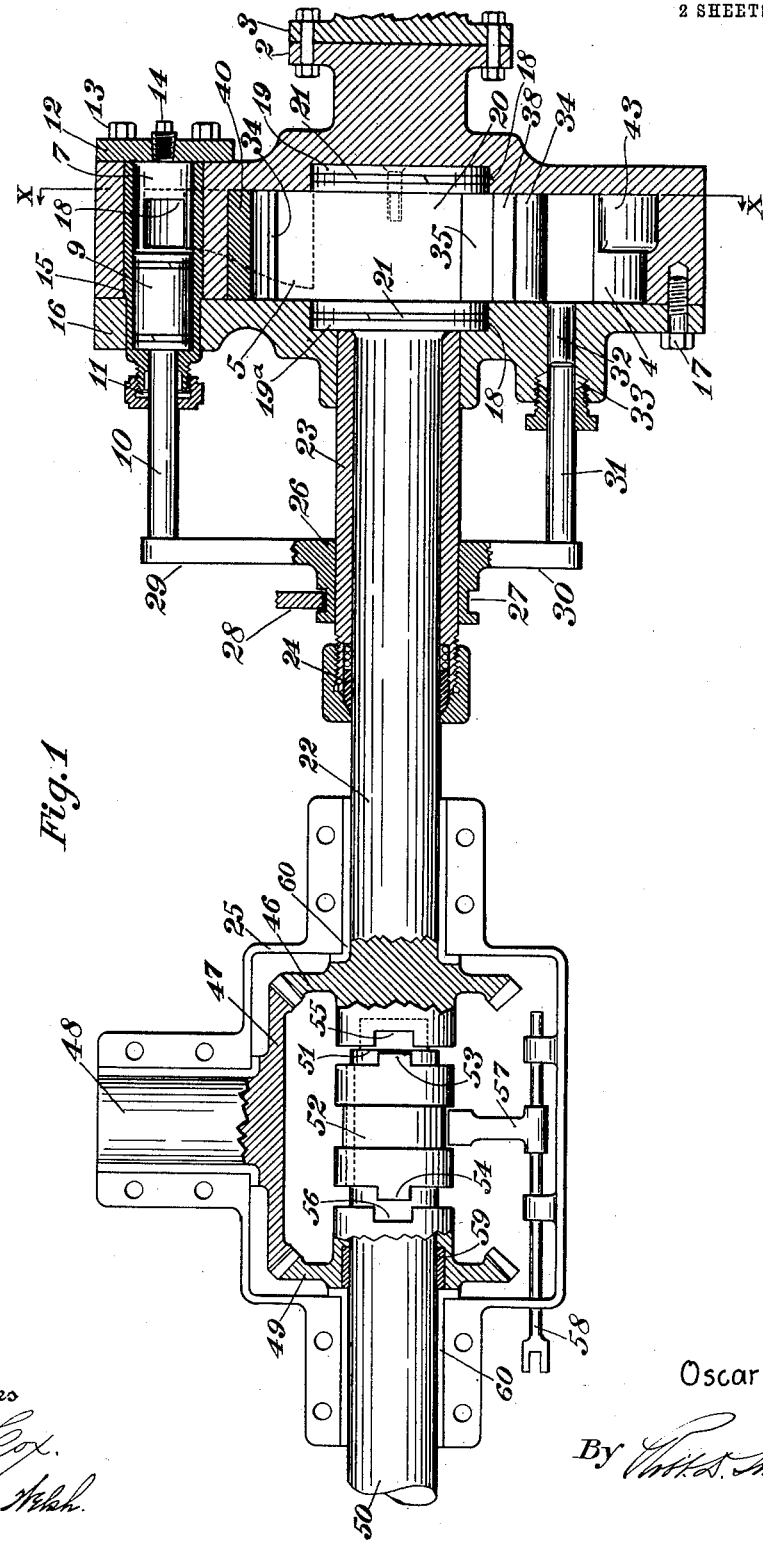

O. N. CRIBB.
VARIABLE SPEED FLUID POWER TRANSMISSION.
APPLICATION FILED SEPT. 12, 1912.

1,100,288.

Patented June 16, 1914.
2 SHEETS—SHEET 1.

Witnesses

Inventor
Oscar N. Cribb
By
Attorney

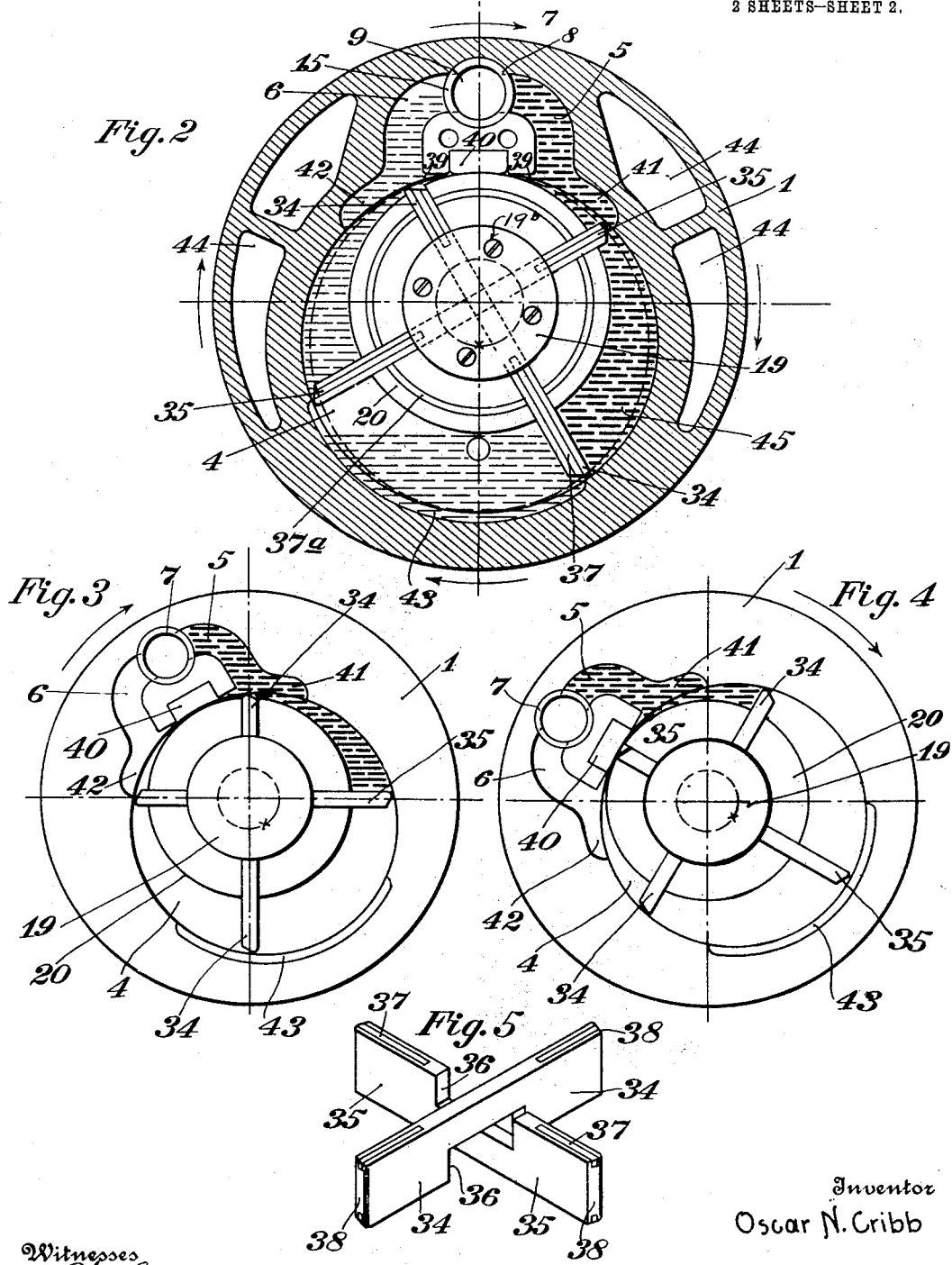

UNITED STATES PATENT OFFICE.

OSCAR N. CRIBB, OF BIRMINGHAM, ALABAMA, ASSIGNOR OF ONE-THIRD TO C. A. JONES AND ONE-THIRD TO MASON MARTIN, BOTH OF BIRMINGHAM, ALABAMA.

VARIABLE-SPEED FLUID POWER TRANSMISSION.

1,100,288.   Specification of Letters Patent.   Patented June 16, 1914.

Application filed September 12, 1912. Serial No. 720,086.

*To all whom it may concern:*

Be it known that I, OSCAR N. CRIBB, a citizen of the United States of America, residing at Birmingham, in the county of Jefferson and State of Alabama, have invented certain new and useful Improvements in Variable-Speed Fluid Power Transmission, of which the following is a specification.

My invention relates to a novel type of fluid or hydraulic transmission mechanism and clutch by means of which a driven element utilizes a circulating body of liquid to transmit a variable speed drive to the driven element.

My invention is more particularly adapted for use in connection with constant speed motors from which it is desired to derive a variable speed drive, as in the case of automobiles, and my object is to dispense with the gear transmission and complicated mechanical clutch devices heretofore employed to obtain this variable speed power transmission and to substitute therefor a comparatively simple, compact, and inexpensive apparatus which is controlled essentially by the regulation of the circulation of the power transmitting fluid which establishes the driving connection between the engine and the running gear.

A further object of my invention is to relieve the fluid of all duty when it is desired to move the driven element at the same speed as the driving element, or under "full speed" conditions, and this I accomplish by a mechanical clutch which interlocks the parts only under the conditions described.

My invention further comprises the details of construction and arrangement of parts which, in their preferred embodiment only, are illustrated in the accompanying drawings, and are hereinafter more particularly described and claimed.

Referring to the drawings:—Figure 1 is a vertical sectional elevation through the rotating chamber head serving as the driving element, the driven element being shown in side elevation and the gear casing being partly broken away to illustrate the reversing gear construction. Fig. 2 is a vertical sectional view taken along the line $x$—$x$ of Fig. 1, the piston head being shown in end elevation and the heavy lines indicating the working portion of the fluid in the high pressure side of the elliptical chamber. Figs. 3 and 4 are diagrammatic views serving to show the piston head and pistons in different operating positions in a chamber formally shown as circular. Fig. 5 is a detail view of the sliding pistons in assembled position as arranged in the piston head which forms the driven element of my apparatus.

Similar reference numerals refer to similar parts throughout the drawings.

My apparatus, in its preferred embodiment, comprises a rotating head 1 preferably circular in form and provided at one end with a collar 2 by means of which it is adapted to be connected to a similar collar 3 which is driven in any suitable manner by a prime mover (not shown). The head 1 is provided with an elliptical chamber 4 having its center disposed eccentric to the axis of rotation of the head 1. This elliptical character of the chamber is more clearly seen by reference to the dotted circle therein which has a diameter equal to the short axis of the ellipse. This chamber is connected by two passages 5 and 6 with a cylindrical chamber bored transversely through the head 1 and adapted to receive a cylindrical ported valve casing 7. This casing has oppositely disposed ports 8 which are adapted to be closed by a piston valve 9 which slides back and forth in the casing 7, being controlled by a valve stem 10 which passes through a suitably packed gland 11 at one end of the casing 7. The casing at its other end is closed by a block 12 secured by bolts 13 to the head 1, this block being provided with a central threaded opening closed by a screw tap 14. The casing 7 is shouldered at 15 and its reduced end is passed through a side plate 16 which covers the opposite side of the head 1 from that carrying the flange 2 and is suitably secured to the head by a series of cap screws 17. This side plate 16 serves to inclose the chamber 4, and, by engaging a shoulder 15 on the valve casing 7, it holds the latter in position between it and block 12. Oppositely disposed circular bearing seats 18 are bored in the inner side walls of head 1 and plate 16 and are disposed concentric with the axis of rotation of the head 1. These bearings receive and support the annular bearing shoulders 19 and 19$^a$ of the circular piston-head 20 which moves with a close running fit between the side walls of the chamber 4. Packing rings 21 surround these shoulders to prevent the leakage of fluid from the chamber along the shaft 22 to which the head is connected or with which it is formed integral. This shaft 22 turns in a bearing sleeve 23 which enters a suitably flanged opening provided therefor in the plate 16 and is fastened thereto preferably by being forced in said opening to make a tight non-leaking joint. If desired this sleeve 23 may be made integral with plate 16. The shaft 22 passes out of the sleeve through a suitable packing gland 24 and enters a casing 25 which contains the reversing gear mechanism which will be later described. A slip collar 26 is mounted to slide back and forth on the sleeve 23 and has an annular groove 27 which receives a yoke 28 by means of which the sleeve may be moved to and from the head 1. The valve stem 10 is connected to one arm 29 carried by this sleeve and a second arm 30 thereon carries a clutch pin 31 which works through an opening 32 in the head 16. A suitable packing gland 33 packs the clutch pin against leakage of fluid from the chamber. The pin 31 will, in all operating positions of the collar 26 except for full speed, clear the pistons carried by the piston head 20.

The right hand bearing shoulder 19 of the piston head 20 is formed by a circular plate which is detachably connected to the head by screws 19$^b$. The other shoulder 19$^a$ is integral with the head which has two diametric slots cut therethrough (but not through the shoulder 19$^a$) at right angles to each other and into these slots I insert sliding pistons 34 and 35 which are shown in detail in Fig. 5, having first removed the plate 19. After the pistons are in position the plate 19 is again attached to the head by screws 19$^b$ and holds the pistons in position therein. The piston 34 has a central notch 36 cut in its under side (referring to Fig. 5), and the piston 35 has a similar cut in its upper side, the notches being in depth substantially half the width of the pistons so that the pistons may be interlocked and inserted in the slots and held therein between the shoulders 19. The pistons and piston head have side packing strips 37, 37$^a$, which engage the side walls of the chamber 4 and the opposite ends of the pistons are oppositely beveled at 38. The length of these pistons is practically the short diameter of the elliptical chamber 4. The metal left in the circumferential outer wall of the chamber 4 between the passages 5 and 6 is provided with bevel side faces 39 and between these faces it is recessed to receive a bearing block 40 which makes a close running fit across the periphery of the piston head 20. The passages 5 and 6 extend under the bevel faces 39 and also about the peripheral wall of the chamber 4, as indicated at 41 and 42, respectively. The circumferential wall of the chamber 4 is provided opposite the by-pass 5—6 with a groove 43. The groove and by-pass are in portions of the chamber's periphery subtended by arcs having shorter radii than the arcs subtending the interposed arcuate working portions of the chamber wall. The length of the pistons is such that they are in running contact at each end with the chamber wall, this contact being maintained over the grooved portion also, as the groove extends only partly across the wall. The left hand end of groove 43 (Fig. 2) is diametrically opposite the end of passage 41, and its right hand end is diametrically opposite the end of passage 42. These passages 41, 42, extend nearly across the chamber wall at their inner ends and are contracted in passages 5 and 6 until, as seen in Fig. 1, they have the width of the ports 8. The point designated X is the center of the elliptical chamber 4 and the dotted circle in which it is placed indicates its circular path of travel about the center and axis of rotation of head 20. The center or axis of rotation of both the head 1 and piston head 20 is at a point in the elliptical chamber where all the lines which are drawn across that certain point from side to side of the ellipse and from all parts of the ellipse will all be lines of equal length. Since the sliding pistons bisect this point, they will remain always in running contact with the peripheral wall of the chamber 4. A body of oil 45 substantially fills the space in chamber 4 about the head 20.

Assuming the head 1 to be rotating to the right (Figs. 2 to 4) and at a greater speed than the piston head 20, which will occur when valve 9 is partly closed, a body of oil will be trapped and compressed between the valve and block 40 on one side and whichever piston head happens at the moment to be making a tight running joint with the working portion of the chamber wall between grooves or passages 41 and 43, it being evident that the head 1, due to its relatively greater speed, will bring block 40, representing the point of close running joint between chamber wall and piston head 20, closer to the then effective driving piston, thereby gradually reducing the area of the oil space left between it and the driving piston it is approaching. This produces an oil pack or fluid piston which establishes for a time the driving connection between the heads, such time being determined by the rate of leakage between the running parts which is a constant factor and the leakage through the by-pass 5—6, which is a variable factor controlled by the valve 9. The oil pack is effective against the upper piston end 34, in Fig. 4, to turn it with the head 1 until the increased speed of the head brings this piston 34 to neutral position, as shown in Fig. 3, when the oil pack is relieved by the piston coming opposite chamber 41 and losing its tight running joint with the chamber wall. When this is the case it will be seen in Fig. 3 that the lower right hand piston head 35 has moved past the groove 43 and having made a close joint with the chamber wall, the oil has become packed against it so that it now takes up the load and drives the piston head 20 until such driving piston arrives at a neutral position, as in Fig. 2, when the oil pack becomes effective against the lower end of piston 34, which will carry the load, the pistons thus successively being engaged and driven by oil packs which are created between them and the bearing block 40 in the chamber wall which makes a close running fit against the circular periphery of piston head 20 and thus traps a body of oil in a gradually contracting area. Obviously, the relative speed between the heads 1 and 20 will be determined by the life of the several oil packs, as they successively become the driving connection, for if there be no leakage nor diminution of an oil pack, it acts like a rigid driving connection and both heads become locked together for like speeds. The rate of leakage of the oil packs determines the speed ratio between the driving and driven parts. After a piston clears the block 40 and moves from under the passage way 42, it again resumes a tight joint with the chamber wall until it reaches the relief groove 43. This gives a suction action which tends to draw the oil through the passages 5 and 6 and facilitates the circulation thereof. The light lines indicate the oil under pressure. The clearance provided by the groove 43 permits the oil sucked in behind a piston to circulate by and collect in front of it to provide the requisite quantity of oil to produce the oil pack against such piston as soon as it moves out of register with said equalizing groove. While the oil pack may be relied upon to practically drive the piston head at full speed, I prefer to relieve the oil pack of this duty by providing the clutch pin 31 and so designing its operating connections that only after the valve 9 has been moved, by adjusting sleeve 26, to fully close the valve ports 8, will said pin arrive at the inner end of the slot 32. A continued movement of the valve 9, for which provision is made in the casing and which is obviously without effect, permits the clutch pin to be moved inwardly so that it projects well into the chamber and into position to be engaged by one of the pistons and it thereby interlocks the heads 1 and 20 by a positive and mechanical means. The pin opening 32 is disposed so as to just clear the periphery of the head 20. In slipping the sleeve 23 to the left (Fig. 1) the clutch pin will be withdrawn from the chamber before the valve 9 reaches a position where it begins to open the ports 8 and permit the regulated leakage of fluid through the by-pass provided by the passages 5 and 6 to provide for the regulated circulation of oil from the high pressure to the low pressure side of the oil chamber. Within the scope of my invention, this by-pass may be variously disposed and may be considered as obtained by the regulation of the leakage past the joint itself between the cylinder and the piston head. If chamber 4 be circular, as diagrammatically shown in Figs. 3 and 4, the pistons in passing over the groove 43 will clear the chamber wall and the groove may be dispensed with, but as this will cause the pistons to rattle or jerk as they resume engagement with the working portion of the chamber wall, I prefer the peripheral wall of the chamber elliptical so that the pistons are maintained always at close running fit therewith and rattling is avoided.

Referring to the reversing gear drive illustrated in Fig. 1, a beveled pinion 46 revolves with the shaft 22 and meshes with a beveled pinion 47 mounted in bearings 48 and meshing with a beveled pinion 49, similar to 46, and mounted for free rotation on a shaft 50. A clutch collar 52 is splined on the shaft 50 and provided with clutch projections 53 and 54, the former being adapted to engage in notches 55 provided in the end of shaft 22 and the latter in notches 56 provided in the hub of the pinion 49. A yoke 57 works in a central groove surrounding the collar 52 and, under control of the rod 58, adjusts the collar into either neutral position, as shown; or into engagement with the notches 55 for effecting a direct drive between the shafts 22 and 50 (the gear 49 then running idle); or into the notches 56, when the direct forward driving connection of the shafts 50 and 22 is broken and the drive takes place through the train of gears 46, 47 and 49, and through the clutch 52 to the shaft 50, thereby driving it in a reverse direction.

The head 1 has metal cut away at the points 44 to balance it about its axis of rotation.

The essential feature of my invention is that the chamber and piston bearing head be so designed and relatively arranged that the pistons are each adapted under predetermined conditions to trap between the piston head and chamber an oil pack, which constitutes the driving medium between the chamber and piston head, or vice versa, the length of time during which each successive oil pack serves as the driving medium, i. e., its life as the fluid connection between driving and driven parts, being controllable to determine the ratio of speed between driving and driven elements.

Having thus described my invention, what I claim as new and desire to secure by Letters Patent, is:—

1. In a mechanism of the character described, rotatable driving and driven elements having a common axis of rotation, one element being provided with a chamber having a curved wall struck on a center eccentric to said axis of rotation, a piston head on the other element which is inclosed within said chamber, radially movable pistons carried by said head and adapted to make a running joint with said curved chamber wall, there being a body of fluid confined in said chamber, said piston head and the curved chamber wall being in running contact to form an oil confining chamber in advance of the pistons, means to control the escape of oil from said oil confining chamber, and means to equalize the pressure of oil on each side of the pistons at a predetermined point in their travel.

2. In a mechanism of the character described, rotatable driving and driven elements having a common axis of rotation, one element being provided with a circular piston head and radially movable pistons carried by said head, the other element having a substantially circular chamber disposed eccentric to the element's axis of rotation and adapted to receive said piston head, means to pack the running joint between said elements, said piston head being in engagement with and making a substantially oil tight joint at a certain point on the chamber wall, there being a circulating body of fluid confined in the chamber and adapted to be compressed between the pistons and chamber walls, means to equalize the pressures on opposite sides of each piston head at a point in its travel substantially diagonally opposite the said point of running contact between piston head and chamber, and means to regulate the circulation of the fluid past said point of contact between the piston head and chamber and between the high and low pressure sides of said chamber, substantially as described.

3. In a mechanism of the character described, rotatable driving and driven elements having a common axis of rotation, one element comprising an elliptical eccentrically disposed chamber, the other element comprising a circular piston head disposed within said chamber, means to pack the running joint between the side walls of chamber and piston head, radially movable pistons carried by said piston head which make a tight running joint with portions of the peripheral wall of said chamber, means to produce a tight running joint between the piston head and a portion of the periphery of the chamber, a valve controlled by-pass connecting the high and low pressure sides of the chamber on each side of said portion, and a pressure equalizing by-pass on the opposite side of the chamber from said valve controlled by-pass, substantially as described.

4. In a mechanism of the character described, a rotating driving element having an eccentrically disposed elliptical chamber containing a body of fluid, a rotatable driven element having a circular piston head about which said chamber revolves, adjustable pistons carried by said head which make running contact with the chamber walls, means to regulate the leakage of bodies of oil which are successively trapped between the pistons and the relatively movable, contacting walls of said head and chamber, and means to equalize the pressures on each side of a piston head before it commences to compress the oil ahead of it, substantially as described.

5. In a mechanism of the character described, a rotating driving element having an eccentrically disposed elliptical chamber containing a body of fluid, a rotatable driven element having a circular piston head about which said chamber revolves, the center of rotation of both driving and driven elements being at a point in the elliptical chamber at which a piston extending through the head and engaging the peripheral walls of the chamber will remain in contact therewith throughout its cycle of rotation, means to pack the running joint between said elements, a pair of pistons disposed at right angles to each other and radially adjustably mounted in said head with their outer ends continuously in running contact in the chamber walls, means to regulate the leakage of bodies of oil which are successively trapped between the pistons and the relatively movable walls of said head and chamber, and means to provide for the circulation of fluid from one side to the other about a piston before it traps a body of fluid, substantially as described.

6. In a mechanism of the character described, a driving and a driven element having common axes of rotation, the driving element having an elliptical fluid containing chamber disposed eccentric to its axis of rotation, the driven element comprising a circular piston head which makes a close running joint with the side and peripheral walls of said chamber, radially movable pistons carried by said piston head and adapted, each, to make a tight running joint with the chamber walls for a portion of each cycle of its rotation within said chamber, a bearing block in the peripheral wall of the chamber which makes a close running joint between the chamber and the periphery of the piston head, a valved by-pass establishing communication between the chamber on each side of said block, there being a fluid circulation clearance provided between the pistons and chamber at a point in the rotation of the former within the latter, as and for the purposes described.

7. In a mechanism of the character described, a rotating driving head provided with a curved chamber eccentric to its center of rotation and having a valve controlled by-pass in one portion of the chamber, and a fluid equalizing passage provided at a substantially opposite portion of the chamber, a circular piston head connected to the driven element and disposed within said chamber concentric with the axis of rotation of said driving head, radially movable pistions carried by said head and which make a close running joint with the side and peripheral wall of the chamber except when opposite the by-pass and the fluid equalizing passage, means to establish a tight running joint between the piston head and the portion of the chamber wall interposed between the ends of the by-pass, and a body of fluid which substantially fills the space between the chamber walls and said piston head, substantially as described.

8. The combination with rotating driving and driven elements, of an interposed variable speed clutch and transmission mechanism comprising two telescoping elements respectively connected to the driving and driven elements and having common axes of rotation, the outer element having an elliptical eccentrically disposed fluid containing chamber which receives the inner element, means to pack said chamber against the leakage of fluid therefrom, radially movable pistons which extend through the inner element having a length equal to the short radius of the elliptical chamber, means to interrupt the running joint between pistons and chamber at one point in each cycle of their rotation, and means operating at another point in each cycle of the pistons' rotation to regulate the leakage of fluid trapped by each piston successively past the joint between the piston head and chamber.

9. In a mechanism of the character described, a rotatable piston head, a driving head having an eccentrically disposed elliptical chamber which receives the piston head, means to pack the joint between the chamber and head, radially movable pistons which project through the piston head and correspond in length to the short axis of the elliptical chamber, said elliptical chamber having on one side of its long axis a valve controlled by-pass, and on the opposite side an arcuate equalizing recess which extends only partly across the peripheral wall of the chamber, and a body of oil in said chamber, substantially as described.

10. In a mechanism of the character described, a rotatable head provided with an eccentrically disposed substantially circular chamber, a piston head having radially movable pistons disposed in said chamber and adapted to engage its peripheral walls, a portion of said chamber being adapted to move with a close running contact with the periphery of the piston head, passages leading from the peripheral wall of the chamber on each side of said portion to a valve chamber, a transversely movable valve in said chamber which controls the flow of fluid through said passages from one side to the other of the chamber, a clutch pin adapted to project into the chamber and interlock the piston head and chamber head, said valve and pin being controlled by a common operating means, and a body of oil held against leakage from said chamber, substantially as described.

11. In a mechanism of the character described, a driving and a driven mechanism interposed between said elements and comprising a fluid containing cylinder, a piston element in said cylinder, means to impound fluid between the cylinder walls and piston to establish a driving connection, means to regulate the circulation of fluid in said cylinder to control the relative driving speed between the cylinder and piston, and a clutch pin connected up with said control mechanism for the fluid and adapted to positively interlock the piston element and cylinder when said regulating means is moved to its extreme position in which the maximum driving speed is produced by means of the fluid, substantially as described.

In testimony whereof I affix my signature in presence of two witnesses.

OSCAR N. CRIBB.

Witnesses:
 NOMIE WELSH,
 R. D. JOHNSTON, Jr.